(12) United States Patent
Steigler (10) Patent No.: US 9,799,083 B2
(45) Date of Patent: Oct. 24, 2017

(54) CORRELATING CONSUMPTION AND VOLTAGE DATA TO IDENTIFY LINE LOSS IN AN ELECTRIC GRID

(71) Applicant: ORACLE INTERNATIONAL CORPORATION, Redwood Shores, CA (US)

(72) Inventor: Patrick Steigler, Oakland, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 381 days.

(21) Appl. No.: 14/525,307

(22) Filed: Oct. 28, 2014

(65) Prior Publication Data

US 2016/0117326 A1  Apr. 28, 2016

(51) Int. Cl.
| | |
|---|---|
| *G06Q 50/06* | (2012.01) |
| *G05F 1/00* | (2006.01) |
| *G06F 17/30* | (2006.01) |
| *G06F 1/32* | (2006.01) |
| *G05F 1/70* | (2006.01) |
| *G05F 1/67* | (2006.01) |
| *G05F 1/66* | (2006.01) |

(52) U.S. Cl.
CPC .............. *G06Q 50/06* (2013.01); *G05F 1/66* (2013.01); *G05F 1/67* (2013.01); *G05F 1/70* (2013.01); *G06F 1/3234* (2013.01); *G06F 17/3053* (2013.01); *G06F 17/30864* (2013.01)

(58) Field of Classification Search
CPC ........ G06Q 50/06; G06F 17/30; G06F 1/3234
USPC ......................................................... 707/725
See application file for complete search history.

(56) References Cited

U.S. PATENT DOCUMENTS

| | | | | |
|---|---|---|---|---|
| 2009/0132096 | A1* | 5/2009 | Swarztrauber | G06Q 30/0283 700/295 |
| 2013/0076534 | A1* | 3/2013 | Conant | G06Q 10/10 340/870.02 |
| 2015/0194812 | A1* | 7/2015 | Bell | G01D 4/004 307/31 |
| 2015/0378383 | A1* | 12/2015 | Hsu | G01R 31/2825 700/295 |

\* cited by examiner

*Primary Examiner* — Pierre Vital
*Assistant Examiner* — Alicia Antoine
(74) *Attorney, Agent, or Firm* — Cooper Legal Group, LLC (57) ABSTRACT

Systems, methods, and other embodiments associated with identifying non-technical line loss using data from smart meters in an electric grid are described. In one embodiment, a method includes querying a utility database to collect meter data, wherein the meter data is from electric meters connected to a transformer in an electric grid. Querying the utility database includes collecting the data according to a plurality of intervals over a period of time. Electric consumption and voltage variances are analyzed for the set of meters to identify a first set of intervals that satisfy a threshold for electric consumption and to identify a second set of intervals that satisfy a threshold for voltage variances. The first set of intervals is compared with the second set of intervals to determine whether the set of meters are associated with non-technical line loss.

20 Claims, 3 Drawing Sheets

CORRELATING CONSUMPTION AND VOLTAGE DATA TO IDENTIFY LINE LOSS IN AN ELECTRIC GRID

BACKGROUND

For electric utility companies, line loss can be a major source of lost revenue. Line loss is the loss of electricity during transmission and distribution through an electric grid. In general, there are two types of line loss. Technical line loss is associated with loss of electricity from physical properties of the metal wires and the electric grid. Non-technical line loss is caused by theft of electricity or other non-technical sources such as clerical errors. Determining locations for a source of line loss can be difficult.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that provide for identifying likely sources of non-technical line loss according to correlations between consumption and voltage fluctuations. In one embodiment, utility data is collected for a set of electric smart meters associated with a transformer. The utility data includes, for example, information collected on at least an hourly basis for each electric meter connected to the transformer. In general, the utility data includes an hourly average voltage for each meter and hourly consumption data for each meter.

The voltage and the consumption data for a meter should correlate. For example, a lower voltage is indicative of a higher consumption for a particular meter. This is because as a load on the meter draws electric power the voltage at the meter may drop below a standard voltage. Therefore, when a meter with a lower voltage does not correspond with a higher consumption, non-technical line loss (i.e., electricity theft) is likely occurring. The meter may be identified and flagged so that further investigation can be performed. In this way, data that includes voltage variances and electricity consumption can be correlated to determine whether the utility data indicates a presence or possibility of non-technical line loss.

Figure 1:
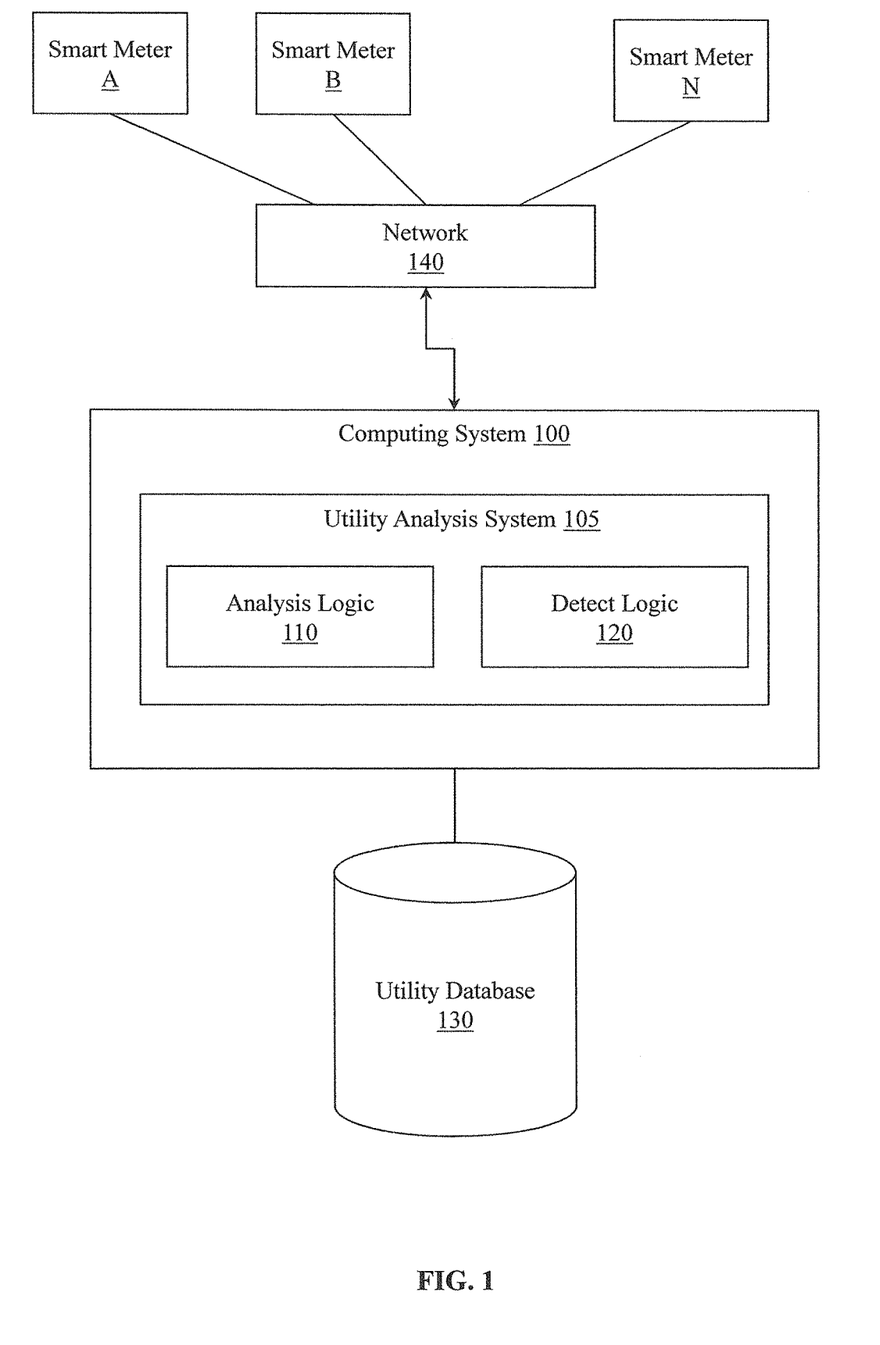
FIG. 1 illustrates one embodiment of a system associated with identifying sources of line loss by using smart meter data.

With reference to FIG. 1, one embodiment of a computing system 100 associated with identifying sources of line loss is illustrated. The system 100 includes a utility analysis system 105 configured as an executable application that includes at least analysis logic 110 and detect logic 120. In one embodiment, the analysis logic 110 is configured to collect data from a utility database 130 that is subsequently correlated by the detect logic 120 to identify whether line loss is present or at least a suspicion of line loss may be occurring.

In general, the system 100 is a computer system that includes at least a processor, memory, and network interface, and includes the utility analysis system that is configured to communicate with a number of smart meters A-N over a communication network 140. The smart meters, for example, are configured in various remote locations and operate in an electric grid with at least one transformer. The computer system 100 collects meter data from smart meters and stores the data in the utility database 130 in data structures such as data records, data tables, files, etc. for each smart meter. The electric grid is an electric distribution network of a utility company. Accordingly, the electric grid includes many different components. The different components connect from a power generation station down to meters at each location of service (e.g., residential location) to provide electricity. Generally speaking, a transformer in the electric grid provides electricity to a set of meters that may include from one to hundreds of meters.

The meters are, for example, smart meters that are connected to power lines. The smart meters are configured to monitor and log data about electric usage over the power lines. In one embodiment, the meters provide information about electric usage on-demand via network messages to the system 100. Accordingly, the meters may provide continuous data about electric usage, data at some predefined interval, or data when requested. In either case, the information may be provided from the meters at a rate which is most relevant to a particular implementation. The information stored in the utility database 130 is collected to provide an accurate representation of consumption and voltage values for a granularity of a time interval at which analysis of the information will be undertaken.

For example, the information stored in the database 130 includes both electric consumption data and voltage data. The electric consumption data indicates how much electricity has been consumed by a load attached to a meter. In one embodiment, the electric consumption data for each meter is provided at an interval of an hour. In this way, enough data is available to provide an accurate portrait of consumption while not over-burdening storage. However, in another embodiment, the consumption data may be provided at an interval of the minute, half hour, day and so on.

With respect to the data itself, the voltage data is data for each meter that indicates a current voltage present at the meter. In one embodiment, the voltage data may be an average voltage for an interval of time (e.g., one hour). Accordingly, the voltage data may be expressed as a mean for the interval of time (e.g., root mean square (RMS)) for the interval or whichever form is most applicable to a given interval. Of course, the data may be organized and formatted in other desired formats using different types of data structures and may include a variety data attributes/properties that are collected and stored.

After some amount of utility data is collected in the utility database 130, an analysis of the data can be performed, for example, in response to a request or a trigger condition (e.g., time interval, etc.). When the analysis initiates, the analysis logic 110 is configured to collect/retrieve the data from the utility database 130 and then analyze the data. In one embodiment, the analysis logic 110 is configured to query the utility database 130 using electronic communications over a communication network. The query may specify a period of time (e.g., one week, one month, etc.) for providing the data and also at which interval or granularity to provide the data (e.g., hourly, daily, etc.).

In one embodiment, the analysis logic 110 receives the data in response to the query and divides the data into appropriate intervals for analysis. Furthermore, the analysis logic 110 requests data related to, for example, meters of a single transformer. Thus, the data collected by the analysis logic 110 includes electric consumption and voltage data for however many meters are connected to the transformer.

Once the data is available, the analysis logic 110 begins analyzing the data by determining voltage variances and electric consumption totals for each interval.

Voltage Variances

In one embodiment, the analysis logic 110 is configured to determine voltage variances from the utility data by calculating a variance for each meter at each interval of time for a period. The analysis logic 110 first determines a maximum voltage among the set of meters for each interval during the period of time (i.e., for each hour of a week). The maximum voltage for each interval is a reference voltage for that respective interval. As one example, the reference voltage will be a standard line voltage that is supplied to each meter by the transformer (e.g., 120 volts).

The analysis logic 110 uses the reference voltage for each interval to calculate a difference between the reference voltage for an interval and voltages of the meters for the same interval. The difference for each meter in the interval is a voltage variance for that particular meter and that particular interval. The analysis logic 110 calculates the voltage variances across all intervals of the period of time for each meter. Thus, in an example where there are ten meters for the transformer, there will be ten separate voltage variances for each interval.

The voltage variances indicate a variation from the reference voltage. When a voltage variance exists it is generally a function of consumption at a meter exhibiting the variance. That is, when an electric load is attached to the meter, the load will cause a voltage at the meter to be pulled down by a number of volts relative to the load (e.g., 5-10 volts). Additionally, when a meter is being bypassed because of electricity theft (i.e., non-technical line loss), the meter will exhibit a voltage variance while not registering a correlating electric consumption. Therefore, the voltage variance for a meter can be used as an indicator of electricity theft when correlated with electric consumption. The system 105 may generate a signal or other message that identifies meter as a candidate meter for further investigation.

In one embodiment, once the analysis logic 110 has calculated the voltage variances for each interval over the period of time, the analysis logic 110 proceeds by determining which of the intervals have voltage variances that satisfy a threshold voltage condition. The analysis logic 110, for example, sorts the voltage variances for the period of time according to greatest variation to lowest variation. The analysis logic 110 then analyzes the sorted voltage variances to determine which of the intervals satisfy the threshold voltage condition.

In one embodiment, the threshold voltage condition is a function of a percentage among all of the intervals. That is, the analysis logic 110 determines that a particular interval satisfies the threshold voltage condition when an interval is within a specified percentage for voltage variances among the intervals. For example, an interval satisfies the voltage threshold condition when the interval is in a top decile (i.e., top 10%) of intervals for voltage variances. That is, the interval has a greater amount of variances than ninety percent of the intervals as a whole. The analysis logic 110 identifies intervals that satisfy the threshold voltage condition and groups those intervals into a first set of intervals. Of course, while a top decile is discussed, in other embodiments, a different voltage threshold condition may be implemented. For example, a top 5 percent or a top 20 percent.

Electric Consumption

In one embodiment, the analysis logic 110 is configured to determine electric consumption for each interval from the utility data. The analysis logic 110 sums electric consumption for each interval to provide a total electric consumption for each interval over the period of time. In one embodiment, the analysis logic 110 calculates a total electric consumption for each interval by summing an electric consumption from each of the meters for a respective interval. As a result, the analysis logic 110 provides a total consumption of electricity for each of the intervals over the period of time. In general, the total consumption for each of the intervals is recorded in, for example, kilowatt hours (kWh).

Furthermore, the analysis logic 110 is configured to, for example, determine which of the intervals satisfy a consumption threshold condition. In one embodiment, the analysis logic 110 sorts the intervals according to a total consumption from the meters for each interval. Accordingly, the analysis logic 110 generates a record of intervals with a highest consumption to intervals with a lowest consumption.

The analysis logic 110 further determines which of the intervals satisfy the threshold consumption condition. In one embodiment, the threshold consumption condition is a top decile of intervals with the most consumption among all of the intervals for the period of time. That is, the analysis logic 110 determines an interval satisfies the threshold consumption condition if an interval is in a top 10 percent of the intervals for electric consumption. If an interval satisfies the threshold consumption condition, then the analysis logic 110 groups the interval into a second set of intervals to record the interval as satisfying the consumption threshold condition. In this way, the analysis logic 110 may determine which of the intervals over the period of time have a highest electric consumption.

Line Loss

Once the intervals associated with voltage variances and electric consumption have been determined, the detect logic 120, in one embodiment, correlates the two set of intervals to determine whether non-technical line loss is present among the meters.

The detect logic 120 is configured to, for example, compare the first set of intervals with the second set of intervals. Accordingly, by comparing the intervals with a top consumption and a top voltage variance, the detect logic 120 is determining whether voltage fluctuations among the meters correlates with consumption. If the two sets of intervals do not correlate, then electricity theft is likely present and the meters are flagged for further investigation. In one embodiment, the detect logic 120 determines whether the two sets of intervals correlate by determining whether at least a certain predefined margin/percentage (e.g., 90%) of the intervals with a top voltage variance are also in the intervals with a top electric consumption.

In general, the percentage of correlation may differ depending on a particular implementation; however, when the two sets of intervals do not correlate there is a high likelihood of electricity theft among the meters. Accordingly, the detect logic 120 generates an electronic notification to indicate that the meters should be further investigated for theft. In one embodiment, the detect logic 120 generates a note with the associated transformer and/or each of the meters in the utility database 130 to note the finding.

Figure 2:
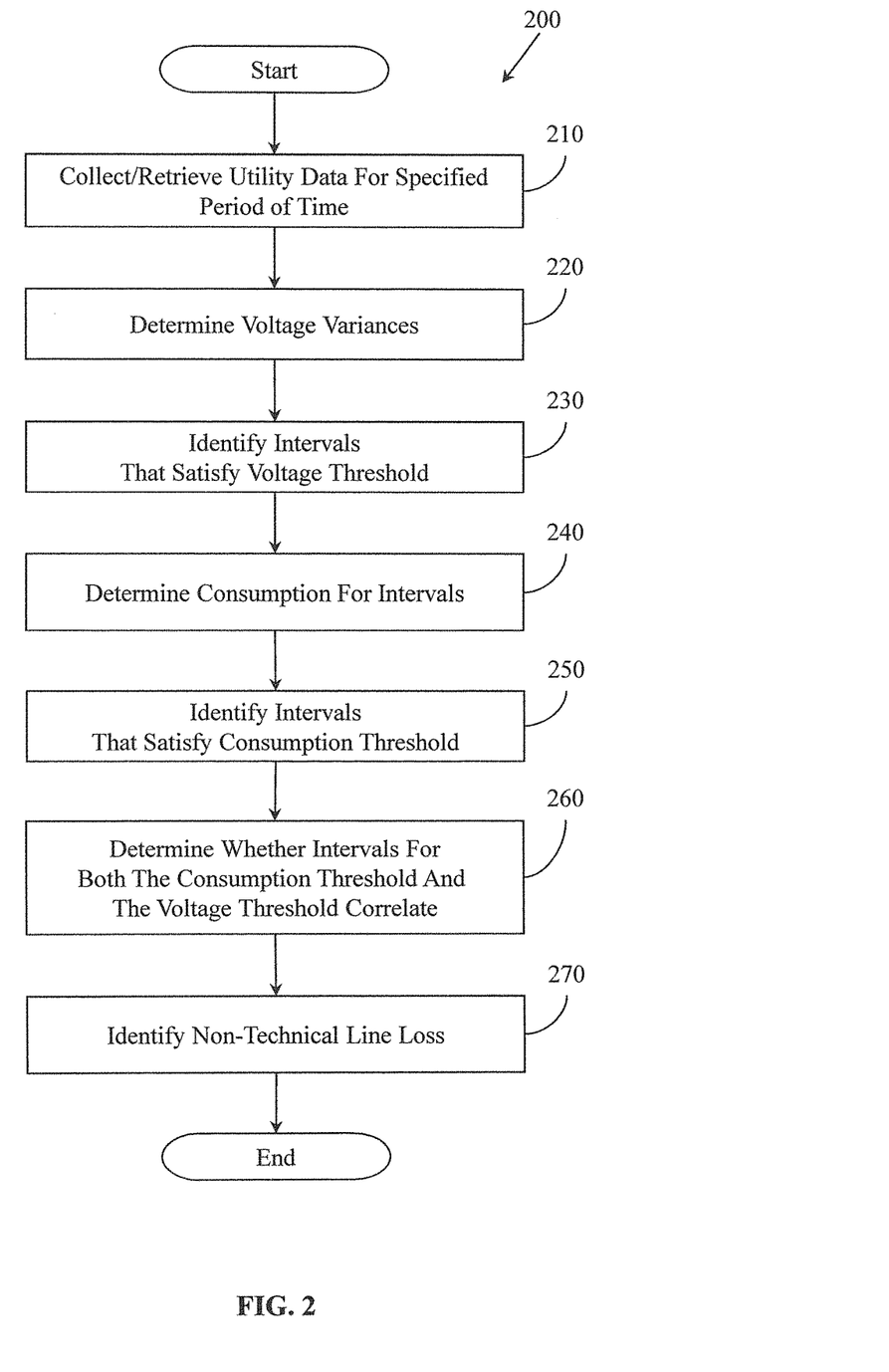
FIG. 2 illustrates one embodiment of a method associated with analyzing voltage and consumption data from electric meters to identify sources of line loss.

Further aspects of identifying sources of electricity theft in an electric grid will be discussed with reference to FIG. 2. FIG. 2 illustrates a method 200 associated with detecting electricity theft using and analyzing data from smart meters.

At 210, utility data is collected/retrieved from a utility database. In one embodiment, the utility database is an electronic database of a utility company that includes information about components in an electric grid of the utility company. The information (e.g., utility/meter data) is generally collected from smart meters and other points within the electric grid to track and record conditions in the electric grid and electric use associated with the smart meters. In one embodiment, the utility data for a particular analysis is collected/retrieved by querying the utility database about electric meters connected to a selected transformer in the electric grid. The utility data is generally collected for an analysis of the electric meters according to a plurality of intervals over a period of time for meters of a single transformer.

Additionally, the utility data includes electric consumption data and voltage data that is divided into the plurality of intervals. Thus, data for a particular set of meters can be collected and provided at a specified granularity (e.g., hour, day, week, etc.) apart from bulk data in the utility database for the whole electric grid.

At 220, voltage variances are determined from the utility data for the meters according to each of the plurality of intervals. In one embodiment, a reference voltage for each of the plurality of intervals is first determined. The reference voltage at each interval is, for example, a voltage of a meter that is a maximum voltage among the meters for that interval. In general, it is expected that the reference voltage would be a standard line voltage (e.g., 120V or 240V). However, as each transformer varies slightly in physical properties and as different operating conditions occur (e.g., weather, load, etc.) the reference voltage may vary from the standard line voltage.

Subsequently, differences between a reference voltage for each of the intervals and mean (e.g., RMS/'Actual' as coming from the meter) voltages for each of the meters at each of the intervals are calculated. As explained previously, variances (i.e., voltage fluctuations) from the reference voltage generally occur when electric consumption at an associated meter is high.

At 230, time intervals that satisfy a voltage threshold are identified. In one embodiment, to identify the time intervals that satisfy the voltage threshold, the voltage variances are first sorted into a list in order of, for example, largest to smallest variances. Thereafter, the intervals that satisfy the voltage threshold can be determined by analyzing the voltage variances. In one embodiment, intervals that are within a predefined percentage among the plurality of intervals for largest voltage variances satisfy the voltage threshold and are recorded in a first set of intervals. That is, if an interval is within, for example, a top ten percent in comparison to voltage variances of the plurality of intervals for the highest voltage variances, then the interval satisfies the voltage threshold.

In one embodiment, at 230, one voltage variance is chosen per each interval with, for example a largest voltage variance of that interval. Subsequently, the selected voltage variances values are analyzed by ordering the variances, to determine which intervals have a largest voltage variance (e.g., surpass a voltage variance threshold).

At 240, electric consumption totals are determined for each of the plurality of intervals. In one embodiment, determining the electric consumption totals includes summing electric consumption for each of the plurality of intervals. That is, all consumption for the meters is added together at each interval to define totals for the plurality of intervals. In this way, interval specific totals for electric consumption can be determined.

At 250, time intervals that satisfy a consumption threshold are identified. In one embodiment, the consumption threshold is a ranking or percentage among the plurality of intervals for electric consumption. Thus, for a respective interval to satisfy the consumption threshold depends on whether the interval is within the predefined percentage (e.g., top 10% for consumption). In this way, intervals with a highest consumption can be recorded and listed in a second set of intervals for comparison.

In general, the electric consumption totals should reflect totals for the transformer associated with the meters. However, transformers themselves are not generally metered. That is, a transformer does not have an individual meter to records how much electricity is provided through the transformer. Instead, each location (i.e., residence) attached to the transformer is metered. Accordingly, at 260, the electric consumption data and voltage variances are analyzed to determine whether the consumption for the set of meters correlates with the voltage variances. Because consumption data is not available for transformers to simply compare with totals from connected meters, correlating voltage variances with individual meter consumption can instead provide an indicator of likely sources of theft.

Thus, at 260, the first set of intervals (i.e., largest voltage variance) is compared with the second set of intervals (i.e., largest consumption) to determine whether the two sets correlate (i.e., match).

At 270, the set of meters is identified as likely including non-technical line loss (i.e., electricity theft) when the first set of intervals and the second set of intervals do not substantially correlate. A signal or message can be generated to indicate the identified meter(s) and the suspicion of electricity theft. In one embodiment, in order to qualify as not substantially correlating 90% of the top decile of intervals with voltage variations (i.e., the first set) are not in the intervals of top decile of intervals for electric consumption (i.e., the second set), then the meters associated with the transformer likely include one or more meters where theft is occurring.

Accordingly, records for the meters may be updated in the utility database to reflect the presence of theft. Furthermore, method 200 may be repeated for other transformers in the electric grid as various transformers are selected or according to some other function.

Computer Embodiment

Figure 3:
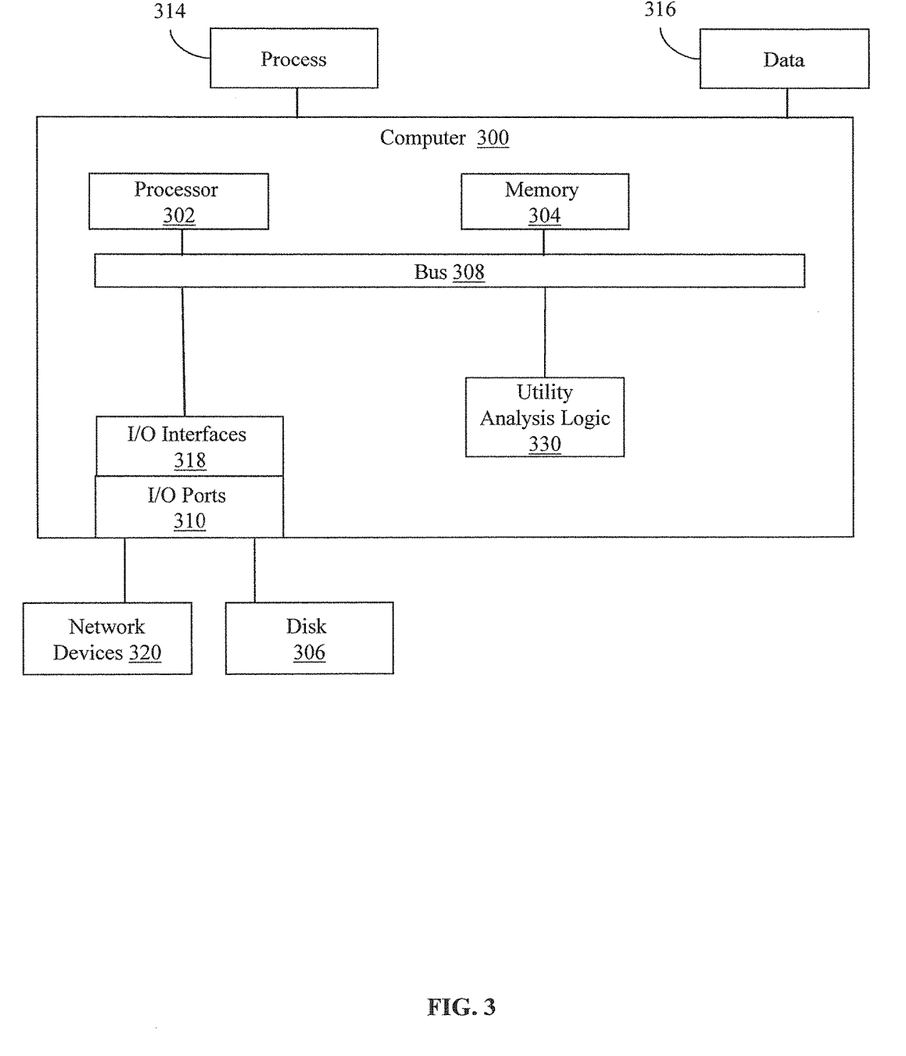
FIG. 3 illustrates an embodiment of a computing system configured with the example systems and/or methods disclosed.

FIG. 3 illustrates an example computing device that is configured and/or programmed with one or more of the example systems and methods described herein, and/or equivalents. The example computing device may be a computer 300 that includes a processor 302, a memory 304, and input/output ports 310 operably connected by a bus 308. In one example, the computer 300 is configured with the utility analysis logic 330 configured to facilitate identifying electric meters associated with non-technical line loss similar to the utility analysis system 105 as shown in the system 100 in FIG. 1. In different examples, the logic 330 may be implemented in hardware, a non-transitory computer-readable medium with stored instructions, firmware, and/or combinations thereof. While the logic 330 is illustrated as a hardware component attached to the bus 308, it is to be appreciated that in one example, the logic 330 could be implemented in the processor 302.

In one embodiment, logic 330 or the computer is a means (e.g., hardware, non-transitory computer-readable medium, firmware) for analyzing data from a utility database to determine whether electric consumption correlates with voltage variances associated with a set of meters in order to identify non-technical line loss.

The means may be implemented, for example, as an ASIC programmed to analyze data from a utility database to determine whether electric consumption correlates with voltage variances associated with a set of meters in order to identify non-technical line loss. The means may also be implemented as stored computer executable instructions that are presented to computer 300 as data 316 that are temporarily stored in memory 304 and then executed by processor 302.

Generally describing an example configuration of the computer 300, the processor 302 may be a variety of various processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output devices via the i/o interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the i/o interfaces 318, and/or the i/o ports 310. Through the network devices 320, the computer 300 may interact with a network. Through the network, the computer 300 may be logically connected to remote computers. Networks with which the computer 300 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can function with. Each type of media, if selected for implementation in one embodiment, includes stored instructions of an algorithm configured to perform one or more of the disclosed and/or claimed functions.

"Logic", as used herein, includes a component that is implemented in computer or electrical hardware, firmware, a non-transitory medium with stored instructions of an executable algorithm/application, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing instructions for execution by a device, the non-transitory computer-readable medium comprising:
    instructions for retrieving data from a utility database, wherein the data from the utility database specifies electric usage information over a period of time that is divided into a plurality of time intervals, wherein the data is meter data from a set of electric meters that are associated with a transformer of an electric grid;
    instructions for analyzing the data and determining a first set of time intervals from the plurality of time intervals with voltage variances that satisfy a voltage threshold condition, wherein the voltage variances are sorted to determine which of the plurality of time intervals satisfy the voltage threshold condition, wherein the voltage threshold condition is satisfied when a time interval is ranked in a first decile for the voltage variances among the plurality of time intervals;
    instructions for determining a second set of time intervals from the plurality of time intervals that include electric consumption that satisfy a consumption threshold condition, wherein the plurality of time intervals are sorted according to electric consumption to determine which of the plurality of time intervals satisfy the consumption threshold condition, wherein the consumption threshold condition is satisfied when a time interval of the plurality of time intervals is ranked in a top decile for electric consumption among the plurality of time intervals; and
    instructions for comparing the first set of time intervals of the voltage variances satisfying the voltage threshold condition and the second set of time intervals of the electric consumption satisfying the consumption threshold condition to identify whether the set of electric meters are associated with non-technical line loss, wherein the non-technical line loss is detected when the first set of time intervals of the voltage variances do not match at least a threshold percentage of the second set of time intervals of the electric consumption within a defined margin.

2. The non-transitory computer-readable medium of claim 1, wherein the data from the utility database includes voltage data on a per interval basis for each of the set of meters and electric consumption data on the per interval basis for each of the set of meters, and
    wherein the instructions for retrieving the data include instructions that cause the data to be collected from the utility database according to the period of time and an interval that correlates with the plurality of intervals, and wherein the instructions for collecting include instructions for querying the utility database according to an electronic communication that includes a query specifying the period of time and the interval.

3. The non-transitory computer-readable medium of claim 1, further comprising:
    instructions for determining voltage variances between a voltage for each of the set of meters at the plurality of time intervals and a respective reference voltage associated with each of the plurality of time intervals, wherein the voltage for each of the set of meters is a root mean square (RMS) voltage for a respective interval of the plurality of time intervals.

4. The non-transitory computer-readable medium of claim 3, wherein the instructions for determining voltage variances include instructions for calculating the voltage variances according to a difference between a voltage for each of the set of meters at the plurality of time intervals and a respective reference voltage associated with each of the plurality of time intervals.

5. The non-transitory computer-readable medium of claim 1, further comprising:
    instructions for determining electric consumption for the set of electric meters at each of the plurality of time intervals by summing a total electric consumption for the set of meters during respective intervals of the plurality of time intervals.

6. The non-transitory computer-readable medium of claim 4, wherein the respective reference voltage for each of the plurality of time intervals is a maximum voltage at each interval of the plurality of time intervals.

7. The non-transitory computer-readable medium of claim 5, wherein the electric consumption for each of the set of meters is a number of kilowatt hours (kWh) for each of the plurality of time intervals.

8. The non-transitory computer-readable medium of claim 1, wherein the non-technical line loss is electricity theft, and wherein the instructions for comparing include instructions to correlate voltage fluctuations and electric consumption among the set of meters to identify irregularities consistent with electricity theft.

9. A computing system, comprising:
analysis logic, stored within memory of the computing system, which when executed by a processor of the computing system causes the processor to determine a first set of time intervals of a plurality of time intervals with voltage variances that satisfy a voltage threshold condition according to data from a utility database, wherein the voltage variances are sorted to determine which of the plurality of time intervals satisfy the voltage threshold condition, wherein the voltage threshold condition is satisfied when a time interval is ranked in a first decile for the voltage variances among the plurality of time intervals,
wherein the analysis logic causes the processor to divide the data that specifies electric usage information over a period of time into the plurality of time intervals, wherein the data is for a set of electric meters that are associated with a transformer of an electric grid;
wherein the analysis logic causes the processor to determine a second set of time intervals from the plurality of time intervals that include electric consumption that satisfy a consumption threshold condition, wherein the plurality of time intervals are sorted according to electric consumption to determine which of the plurality of time intervals satisfy the consumption threshold condition, wherein the consumption threshold condition is satisfied when a time interval of the plurality of time intervals is ranked in a top decile for electric consumption among the plurality of time intervals; and
detect logic, stored within the memory, which when executed by the processor causes the processor to compare the first set of time intervals of the voltage variances satisfying the voltage threshold condition and the second set of time intervals of the electric consumption satisfying the consumption threshold condition to identify whether the set of electric meters are associated with non-technical line loss, wherein the non-technical line loss is detected when the first set of time intervals of the voltage variances do not match at least a threshold percentage of the second set of time intervals of the electric consumption within a defined margin.

10. The computing system of claim 9, wherein the analysis logic causes the processor to collect the data from the utility database, wherein the data includes voltage data on a per interval basis for each of the set of meters and electric consumption data on the per interval basis for each of the set of meters, wherein the analysis logic causes the processor to collect the data by causing the data to be collected from the utility database according to the period of time and an interval that correlates with the plurality of time intervals, and wherein the analysis logic causes the processor to collect the data by querying the utility database according to an electronic communication that includes a query specifying the period of time and the interval.

11. The computing system of claim 9, wherein the analysis logic causes the processor to determine voltage variances between a voltage for each of the set of meters at the plurality of time intervals and a respective reference voltage associated with each of the plurality of time intervals, and wherein the voltage for each of the set of meters is a root mean square (RMS) voltage for a respective interval of the plurality of time intervals.

12. The computing system of claim 11, wherein the analysis logic causes the processor to determine voltage variances by calculating the voltage variances according to a difference between the voltage for each of the set of meters at the plurality of time intervals and a respective reference voltage associated with each of the plurality of time intervals, and wherein the respective reference voltage for each of the plurality of time intervals.

13. The computing system of claim 9, wherein the analysis logic causes the processor to determine electric consumption for the set of electric meters at each of the plurality of time intervals by summing a total electric consumption for the set of meters for respective intervals of the plurality of time intervals.

14. The computing system of claim 12, wherein the respective reference voltage for each of the plurality of time intervals is a maximum voltage among the set of meters for a respective time interval.

15. The computing system of claim 13, wherein the electric consumption for each of the set of meters is a number of kilowatt hours (kWh) for each of the plurality of time intervals.

16. The computing system of claim 9, wherein the non-technical line loss is electricity theft, and wherein the detect logic causes the processor to compare the first set of time intervals and the second set of time intervals to correlate voltage fluctuations and electric consumption among the set of meters to identify irregularities consistent with electricity theft.

17. A method, comprising:
querying a utility database to collect meter data, wherein the meter data is from a set of electric meters connected to a transformer in an electric grid, wherein querying the utility database includes collecting the meter data according to a plurality of intervals over a period of time;
analyzing electric consumption and voltage variances from the meter data for the set of electric meters over the plurality of intervals (i) to identify a first set of intervals of the plurality of intervals that satisfy a threshold for electric consumption in comparison to electric consumption for the plurality of intervals and (ii) to identify a second set of intervals of the plurality of intervals that satisfy a threshold for voltage variances in comparison to voltage variances for the plurality of intervals, wherein the voltage variances are sorted to determine which of the plurality of time intervals satisfy the voltage threshold condition, wherein the voltage threshold condition is satisfied when a time interval is ranked in a first decile for the voltage variances among the plurality of time intervals, and wherein the plurality of time intervals are sorted according to electric consumption to determine which of the plurality of time intervals satisfy the consumption threshold condition, wherein the consumption threshold condition is satisfied when a time interval of the plurality of time intervals is ranked in a top decile for electric consumption among the plurality of time intervals; and comparing the first set of intervals of the voltage variances satisfying the voltage threshold condition with the second set of intervals of the electric consumption satisfying the consumption threshold condition to determine whether the set of meters are associated with non-technical line loss, wherein the non-technical line loss is detected when the first set of time intervals of the voltage variances do not match at least a threshold percentage of the second set of time intervals of the electric consumption within a defined margin.

18. The method of claim 17, further comprising:
identifying the set of electric meters as including non-technical line loss when the first set of intervals and the second set of intervals do not substantially correlate, wherein the first set of intervals and the second set of intervals do not substantially correlate when a defined percentage of intervals in the second set are not present in the first set of intervals.

19. The method of claim 17, further comprising:
determining the electric consumption for the set of meters by summing electric consumption for the set of meters over each of the plurality of intervals; and
determining the voltage variances for the set of meters by determining differences between a reference voltage for each of the plurality of intervals and voltages for each of the set of meters for each of the plurality of intervals.

20. The method of claim 19, wherein the voltage for each of the set of meters is a root mean square (RMS) voltage for a respective interval of the plurality of intervals, wherein the reference voltage for each of the plurality of intervals is a maximum voltage among the set of meters for a respective interval of the plurality of intervals, and wherein the voltage variances indicate fluctuations in voltage due to high consumption at a meter in the set of meters.

* * * * *

UNITED STATES PATENT AND TRADEMARK OFFICE
CERTIFICATE OF CORRECTION

PATENT NO.         : 9,799,083 B2
APPLICATION NO.    : 14/525307
DATED              : October 24, 2017
INVENTOR(S)        : Steigler Page 1 of 1

It is certified that error appears in the above-identified patent and that said Letters Patent is hereby corrected as shown below:

In the Claims

In Column 12, Line 14-16, in Claim 12, delete "intervals, and wherein the respective reference voltage for each of the plurality of time intervals." and insert -- intervals. --, therefor.

Signed and Sealed this
Nineteenth Day of June, 2018

Andrei Iancu
*Director of the United States Patent and Trademark Office*